United States Patent
Irion et al.

(10) Patent No.: US 6,675,663 B1
(45) Date of Patent: Jan. 13, 2004

(54) TORQUE SENSOR WITH A BRIDGE-CIRCUIT OF THICK FILM RESISTORS

(75) Inventors: Jürgen Irion, Sulzbach (DE); Arthur Schäfert, Schwalbach (DE); Bernd Thyzel, Glashütten (DE); Klaus Weber, Kronberg (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/806,013

(22) PCT Filed: Sep. 15, 1999

(86) PCT No.: PCT/EP99/06832

§ 371 (c)(1),
(2), (4) Date: Jun. 28, 2001

(87) PCT Pub. No.: WO00/17617

PCT Pub. Date: Mar. 30, 2000

(30) Foreign Application Priority Data

Sep. 23, 1998 (DE) .......................... 198 43 579

(51) Int. Cl.$^7$ ................................ G01L 1/04
(52) U.S. Cl. ................................ 73/862.627
(58) Field of Search .............. 73/774, 781, 795, 73/862.621, 862.627, 862.628, 862.632, 862.636

(56) References Cited

U.S. PATENT DOCUMENTS 3,707,076 A   12/1972   Jones
4,813,286 A * 3/1989   Kant ........................... 73/726
5,867,808 A * 2/1999   Selker et al. ................. 702/41
6,269,534 B1 * 8/2001   Mattmann et al. ......... 29/621.1
6,309,695 B1 * 10/2001  Singh ......................... 427/103

FOREIGN PATENT DOCUMENTS

DE    3540954    5/1987
DE    19814261   10/1999
EP    0282304    9/1988

* cited by examiner

*Primary Examiner*—Max Noori
(74) *Attorney, Agent, or Firm*—Martin A. Farber

(57) ABSTRACT

A mechanical/electrical transducer which has a bridge circuit formed by electrically connecting strain-sensitive thick-film resistors by conductor tracks, the thick-film resistors being arranged directly on a metallic component to be subjected mechanically to torsional loading and lying outside an axis of the component to be loaded which is neutral with respect to bending moments, it being possible to tap an electrical signal corresponding to the strain of the thick-film resistors when the component is subjected to torsion.

In a mechanical/electrical transducer in which the electrical signal is tapped with the aid of a bridge circuit and in which the production of a bridge signal due to bending moments or tensile and compressive forces is reliably prevented, in each case at least one thick-film resistor (2; 4) in one arm of the bridge circuit is at the same distance from and at an angle of the same magnitude to the neutral axis (z axis) of the component (1) to be loaded as an opposite thick-film resistor (3; 5) in the second arm of the bridge circuit.

24 Claims, 5 Drawing Sheets

TORQUE SENSOR WITH A BRIDGE-CIRCUIT OF THICK FILM RESISTORS

FIELD AND BACKGROUND OF THE INVENTION

The invention relates to a mechanical/electrical transducer which has a bridge circuit formed by electrically connecting strain-sensitive thick-film resistors by means of conductor tracks, the thick-film resistors being arranged directly on a metallic component to be subjected mechanically to torsional loading and lying outside [lacuna] an axis of the component to be loaded which is neutral with respect to bending moments, it being possible to tap an electrical signal corresponding to the strain of the thick-film resistors when the component is subjected to torsion.

A mechanical/electrical transducer of the introductory-mentioned type is known from German Patent Application 198 14 261.7. In the case of this transducer, the strain-sensitive thick-film resistors are arranged directly on a shaft designed as a supporting element. Here, the shaft is subject to a mechanical load in the form of a torsion and the resulting surface strain is picked off by the resistor arranged without an intermediate support on this shaft. The thick-film resistors are here applied to the shaft by a printing method in the form of a resistor paste and are intimately connected to this shaft after a heat treatment.

Ideally, a torque sensor of this kind is intended to measure only torsional moments and to compensate for bending moments and tensile or compressive forces, i.e. no electrical signal should be output at the bridge circuit in the case of bending moments, tensile and compressive forces. If the thick-film resistors of the bridge circuit are arranged outside a zone of the shaft which is free from forces as regards bending moments (neutral axis for bending moments), there is the risk that an unwanted bridge signal will be produced in the case of bending moments and will falsify the sensor signal.

SUMMARY OF THE INVENTION

The object on which the invention is based is therefore to specify a mechanical/electrical transducer in which the electrical signal is tapped with the aid of a bridge circuit but the production of a bridge signal due to bending moments or tensile and compressive forces is reliably prevented.

According to the invention, the object is achieved by virtue of the fact that in each case at least one thick-film resistor in a first arm of the bridge circuit is at the same distance from and at an angle of the same magnitude to the neutral axis of the component to be loaded as the opposite thick-film resistor in the second arm of the bridge circuit.

The invention has the advantage that, when bending moments occur, the thick-film resistors change their resistance value uniformly, the unwanted signal thereby being compensated when they are connected up to form a measuring bridge. This is achieved with the aid of bending-compensated positioning of the thick-film resistors.

As an alternative, the object is achieved by virtue of the fact that the thick-film resistors arranged in one bridge arm are at the same distance from and at an angle of the same magnitude to the neutral axis of the component to be loaded.

In a refinement, the component to be loaded has on its surface an aperture which, when the component is mechanically stressed in at least one area of the surface of the component in which the thick-film resistors are positioned, a relationship of unequal magnitude between the longitudinal and the transverse strain is produced.

The aperture simply boosts the signal behavior of the sensor without any complex changes to the shaft geometry. A sensor of this kind is suitable for mass production since it can be produced economically and in a short time. By virtue of the aperture, the mechanical stresses acting on the component are superimposed, the strain in the principal directions (longitudinal, transverse) being of unequal magnitude, allowing amplification of the signal behavior of the sensor.

It is advantageous if the aperture is designed as a through opening in the component.

In a development, the opening is designed as a slotted hole, the first thick-film resistor of a bridge arm being arranged in the vicinity of a first radial zone of the slotted hole, and the first thick-film resistor of the second bridge arm being arranged in the vicinity of a second radial zone of the slotted hole, the signal being tapped from the bridge arm between the thick-film resistors arranged in the different radial zones.

This circuit configuration on the one hand ensures that the two thick-film resistors situated opposite one another in the bridge arm are at the same distance from the neutral axis and the half-bridge voltage of the two bridge arms change uniformly under the influence of bending moments.

A reliable, identical change in the bending moments of the thick-film resistors is achieved if the thick-film resistors of both bridge arms are arranged in the radial zones above or below the longitudinal extent of the component.

The mechanical/electrical transducer is particularly simple to produce if the thick-film resistors are arranged on a flat surface of the component, which is produced from steel or steel alloys. Since the thick-film resistors are arranged directly on the component to be mechanically loaded and an intermediate support is omitted, the mechanical load to be detected is picked off directly from said component without signal distortions due to the intermediate support. Producing the thick-film resistors directly on the component to be loaded considerably reduces production costs.

To minimize the offset (zero offset) due to production within the bridge itself, a thick-film balancing resistor, the resistance value of which is lower than that of the thick-film resistors, is arranged in each bridge arm. The bridge-circuit output signal obtained in this way makes possible a high gain of the amplifier connected downstream of the mechanical/electrical transducer. At the same time, it allows high resolution of the signal by an A/D transducer where the measurement signal is digitized.

The thick-film balancing resistor of one bridge arm is at the same distance from and at an angle of the same magnitude to the neutral axis of the component as the thick-film balancing resistor of the other bridge circuit. Thus, compensation for the bending moments is achieved by appropriate positioning in the case of the balancing resistors too.

It is advantageous if, for gradation of the resistance, the thick-film balancing resistor comprises. resistance tracks connected in parallel which are severed sequentially during the balancing process.

Digital balancing in this way continues until the offset is at the desired minimum value. This balancing method ensures the long-term stability of the output electrical signal.

In order to make the screen contact surface and distribution of forces during screen printing as uniform as possible, the bridge circuit has a symmetrical layout for production by screen printing. In this case, the resistance value obtained for all the thick-film resistors to be printed is as uniform as possible in order to match the film thickness of the thick-film resistors.

In order to improve the printing accuracy of the resistance values, a strictly symmetrical layout is achieved by arranging stub lines and/or reactors on the surface of the component.

To enable the mechanical/electrical transducer to be used, in particular, for applications critical for safety, such as steering assistance in motor vehicles, a first bridge circuit is arranged above the aperture and a second bridge circuit is arranged below the aperture.

BRIEF DESCRIPTION OF THE DRAWINGS

The invention allows numerous embodiments. One of these will be explained in greater detail with reference to the figures illustrated in the drawing, in which.

Identical features are denoted by identical reference numerals.

DETAILED DESCRIPTION OF THE PREFERRED EMBODIMENTS

Figure 1:
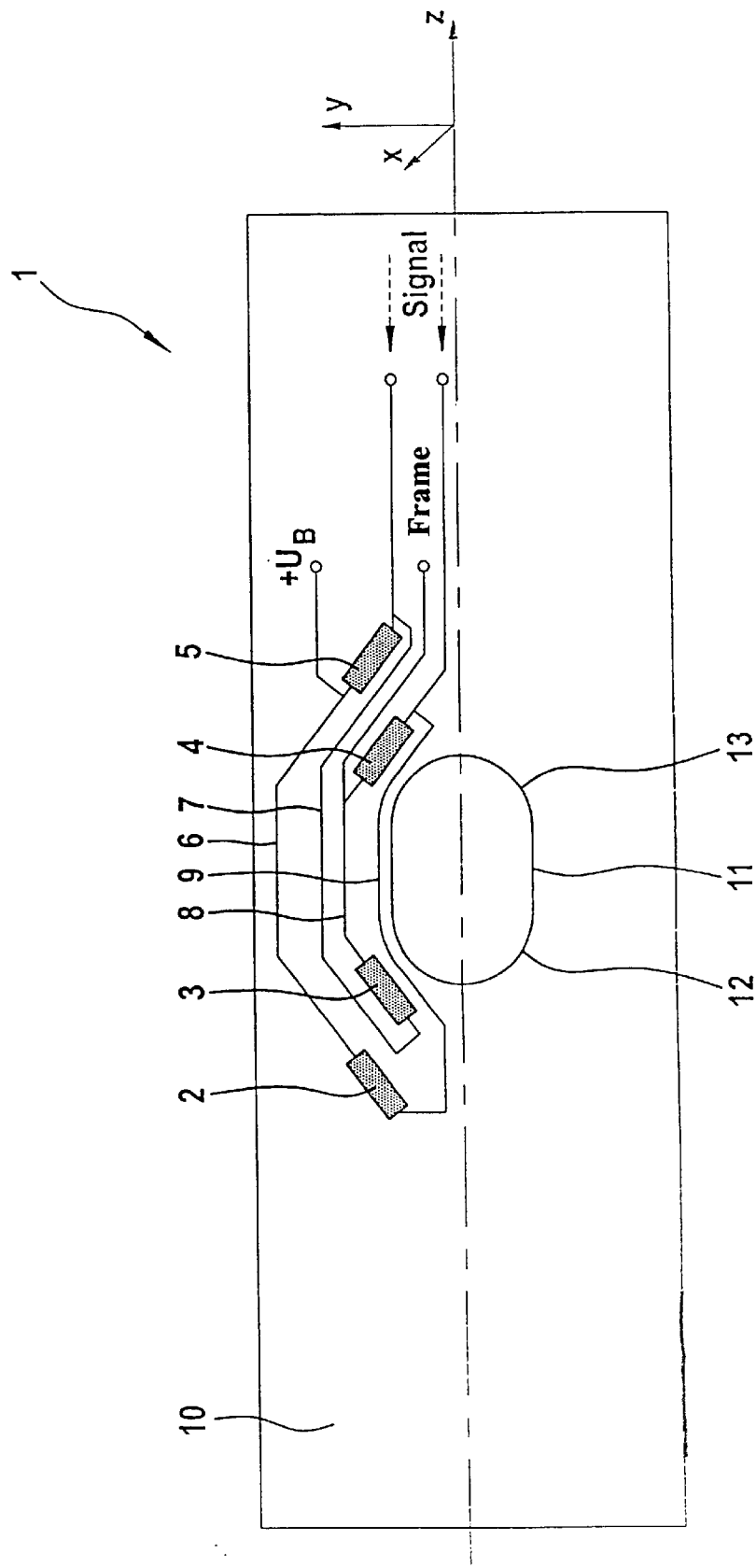
FIG. 1 shows a first embodiment of the thick-film torque sensor according to the invention.

FIG. 1 shows a torque sensor for use in steering servo systems. Arranged on a shaft 1, which is subjected to torsion, is composed of steel or a steel alloy and is of cuboidal design, is a resistance bridge which comprises strain-sensitive thick-film resistors 2 to 5 of identical construction. The thick-film resistors 2 to 5 are connected electrically to a resistance-measuring bridge by conductor tracks 6 to 10.

As can be seen from the plan view in FIG. 1, the shaft 1 has a rectangular surface 10, a slotted hole 11 which passes completely through the shaft 1 being formed centrally in the longitudinal direction (z-direction) of the shaft 1. At its ends, the slotted hole 11 has radial zones 12 and 13 in which two principal strains of different magnitude occur at the surface 10 of the shaft 1 along the center line z illustrated when a torsion acts on the shaft 1, these strains corresponding, from the point of view of the respective thick-film resistor 2 to 5, to a longitudinal strain and a transverse strain.

The thick-film resistors 2 and 3 are arranged in the radial zone 12 of the slotted hole 11, while the thick-film resistors 4 and 5 are arranged in the radial zone 13 of the slotted hole 11. The way in which the conductor tracks are laid out means that the resistors 2 and 4 form one bridge arm, while the resistors 3 and 5 form the second bridge arm. In this arrangement, the frame line 7 passes to the resistors 3 and 4 and the supply voltage $U_B$ (line 6) is connected to the resistors 2 and 5. If the shaft 1 is subjected to torsion, the strain signal of the resistance-measuring bridge is tapped at the lines 7 and 9.

Figure 2:
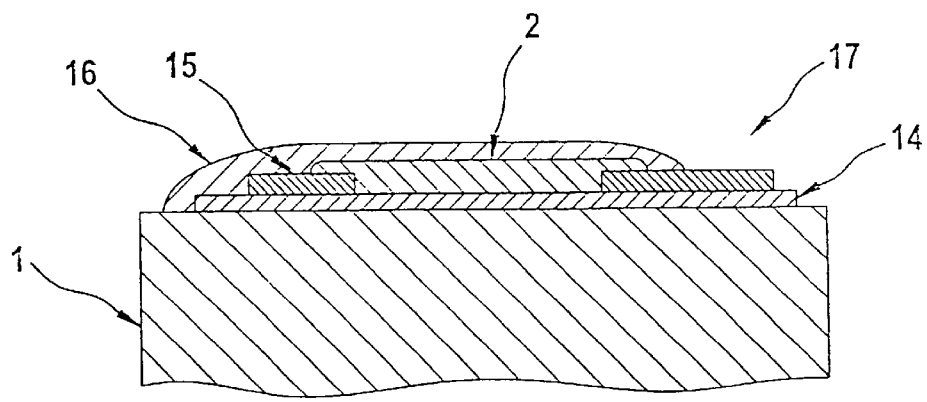
FIG. 2 shows a thick-film resistor in section.

The entire resistance bridge is arranged on a dielectric 14, which rests directly on the component 1. FIG. 2 shows a section through a strain-sensitive resistor.

The conductor-track layer 15 is situated on the dielectric 14. Arranged between the terminals of the conductor tracks is an electrical resistance layer which forms the resistor 2, which is designed as a strain gauge. Finally, there is a passivation layer 16, which leaves only the contact surfaces 17 for the electrical contacting of the resistor 2 uncovered.

The strain gauge described is produced directly on the support 1 using thick-film technology.

In order to produce an intimate connection between the dielectric 14 and the component 1, the dielectric 14 is applied to the shaft 1 by means of a non-conductive paste using a printing technique. The paste contains a glass frit which can be melted at a lower temperature than the material of the shaft 1. After the paste has been applied, a conducting layer is applied, likewise by screen printing, this layer forming the conductor-track layer 15 and the contact surfaces 17 and the resistance layer forming the resistors being arranged in turn on this layer. The shaft 1 prepared in this way is heat-treated in a high-temperature process at a temperature of about 750° C. to 900° C. In the course of this treatment, the glass layer sinters to the surface of the steel of the shaft 1. As it sinters on, oxide bridges are formed between the dielectric 2 and the shaft 1 and these bridges ensure a permanent connection between the shaft 1 and the dielectric 14, thereby ensuring a strong and intimate connection between the two.

In order to improve printing accuracy during screen printing, reactors 27 and stub lines 28 are incorporated into the layout in order in this way to keep the resistance tolerances in the production of the strain gauges narrow.

As can be seen from FIG. 1, the resistance bridge is connected up around the slotted hole 11 in a longitudinal direction relative to the shaft axis z. The individual resistors 2 to 5 are positioned in pairs relative to the X and Y axes to the neutral axis. The neutral axis as regards bending moments, given this simple geometry of the cuboidal shaft, extends along the longitudinal orientation z in the center of the shaft 1. The thick-film resistors 3 and 4 are at approximately the same distance and the same angle to the neutral axis at every point along their two-dimensional longitudinal extent. The same applies to the thick-film resistors 2 and 5, which although positioned at a different point, fulfill the same conditions mentioned above. By virtue of this arrangement, the thick-film resistors 2, 5 and 3, 4 change in an identical manner in the case of bending moments, with the result that no signal due to bending is accepted via the bridge circuit.

The signal path will be illustrated with reference to FIG. 3. Each bridge arm 2, 4 and 3, 5 is connected both to a supply voltage $U_B$ and to frame. A half-bridge voltage $U_{H24}$ and $U_{H53}$ respectively are capable of being tapped with respect to frame between the thick-film resistors of a bridge arm. The measurement voltage $U_{mess}$, which represents the output voltage of the torque sensor, is tapped between the two half-bridge voltages. Given the configuration of the torque sensor explained in connection with FIG. 1, opposite resistors 3, 4 and 2, 5 in the bridge circuit are in each case arranged in mirror symmetry with respect to an axis extending perpendicular to the neutral axis. They are each at the same distance and at an angle of the same magnitude to the neutral axis. The effect of this is that, when the shaft 1 is subjected to bending, the half-bridge voltages $U_{H24}$ and $U_{H53}$ change by the same amount and with the same sign. Since the measurement signal $U_{mess}$ represents the voltage difference between the two half-bridge voltages $U_{H24}$ and $U_{H53}$, a change in the half-bridge voltages $U_{H24}$ and. $U_{H53}$ has no effect on the measurement signal $U_{mess}$.

Figure 4:
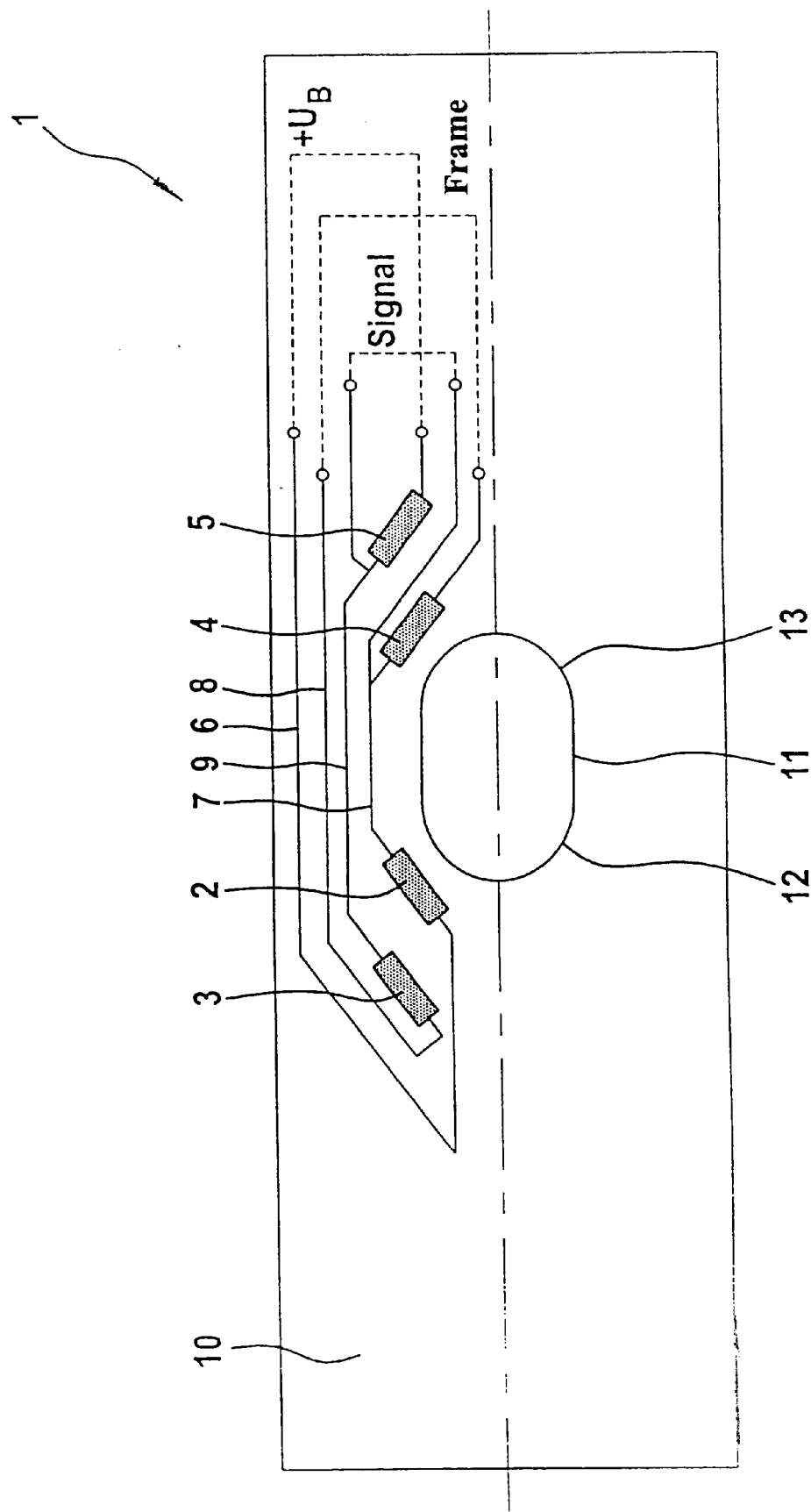
FIG. 4 shows a second embodiment of the thick-film torque sensor.

Another example of the layout of the bridge circuit can be seen in FIG. 4. Here, the thick-film resistors 2 and 4 of the first bridge arm are positioned closer to the slotted hole 11, while the thick-film resistors 3 and 5 of the second bridge arm are arranged at a greater distance from the slotted hole. A symmetrical arrangement is achieved here by a more extensive use of conductor tracks 6, 7, 8, 9.

Figure 3:
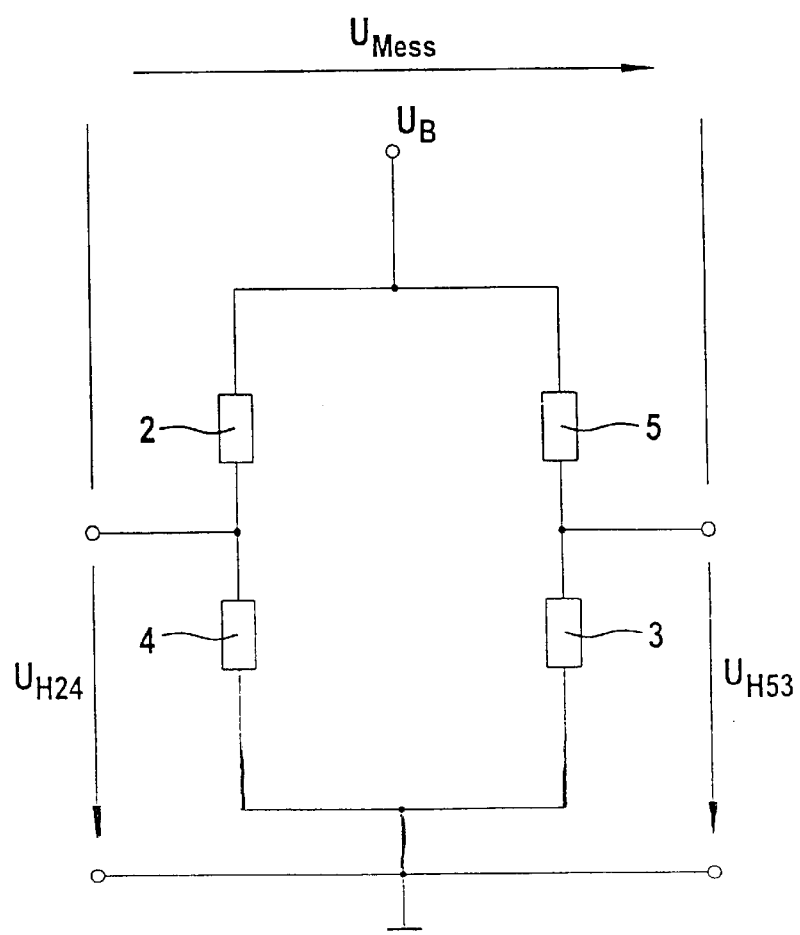
FIG. 3 shows the voltage path in the bridge circuit.

If the voltage conditions of this configuration are considered with reference to FIG. 3, the thick-film resistors 2 and 4 of the first bridge arm are at the same distance and the same angle in terms of magnitude relative to the neutral axis. The same applies to the thick-film resistors 3 and 5 of the second bridge arm. If the shaft. 1 with the thick-film resistors 2, 3, 4, 5 arranged in this way is subjected to bending, no change occurs in the half-bridge voltages $U_{H24}$ and $U_{H53}$, with the result that the measurement signal $U_{mess}$ is unaffected by the bending in this arrangement too.

Because the bridge circuit is produced by means of a screen-printing method, there is an offset in the bridge signal and this represents a problem, particularly with small signals, since it can amount to around 1000% of the useful signal and consequently only a low resolution by the downstream electronic evaluation device 29 is possible. In this arrangement, the signal evaluation circuit 29 is likewise arranged on the dielectric 14 of the shaft 1.

Figure 5:
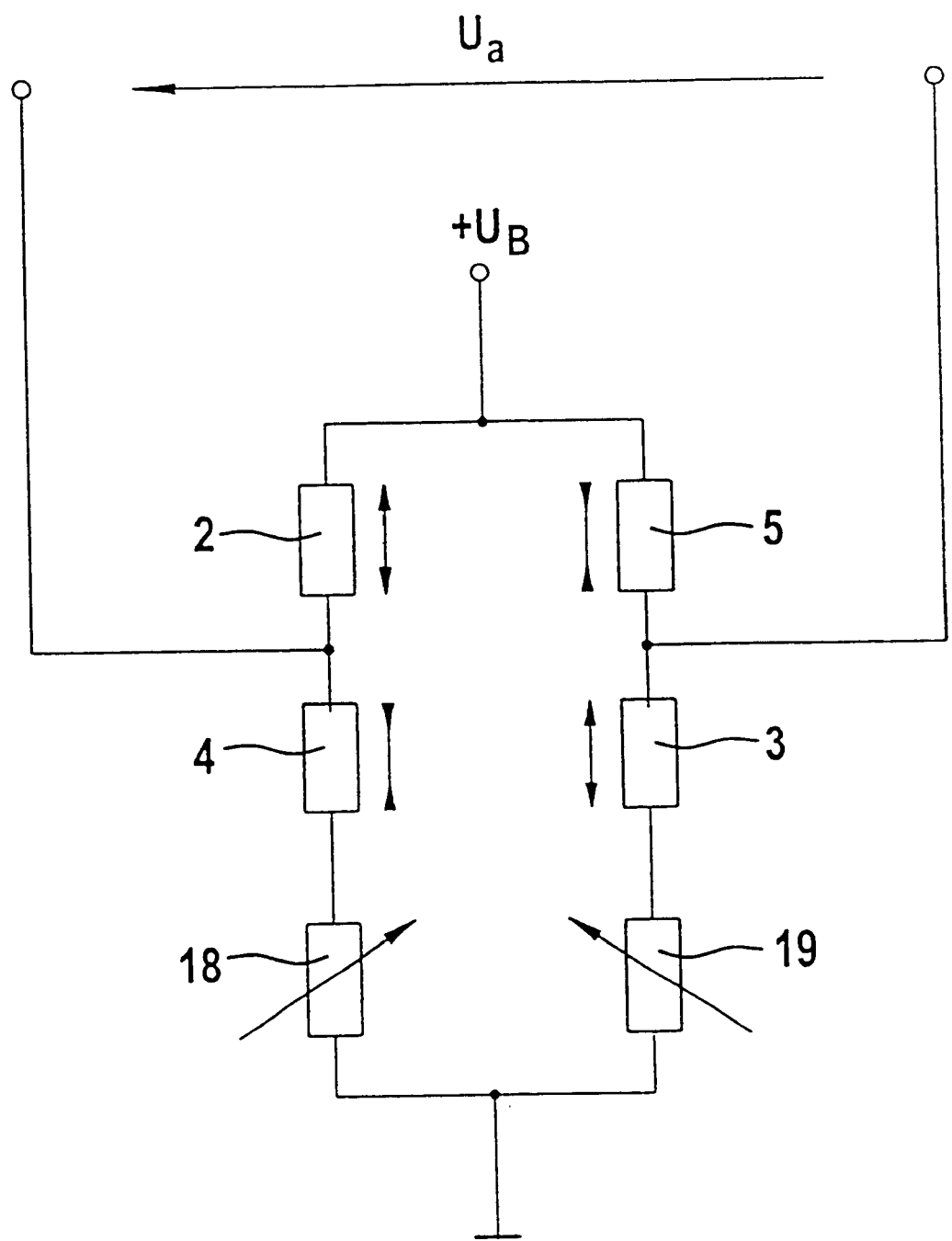
FIG. 5 shows a balancing circuit.

To achieve high amplification, the offset due to manufacture (zero offset) of the thick-film strain- gauge bridge within the bridge is minimized by means of laser-trimmed balancing resistors 18, 19. As can be seen from FIG. 5, each bridge arm contains a balancing resistor 18, 19 connected in series with the thick-film resistors. Thus, in the first bridge arm, there is the balancing resistor 18 in series with the resistors 2 and 4, and, in the second bridge arm, the balancing resistor 19 is connected in series with the resistors 3 and 5. This has the advantage that the thick-film resistors do not have to be trimmed themselves since these have a relatively large influence on the measurement signal due to their high resistance values, and this would impair the long-term stability of the bridge. The balancing resistors 18, 19 have a significantly lower resistance value than the thick-film resistors and consequently they cannot significantly affect the long-term stability of the bridge as a whole after laser trimming.

In an advantageous refinement, the balancing resistors 18, 19 are designed as areas or strips formed by resistance tracks connected in parallel.

Figure 6:
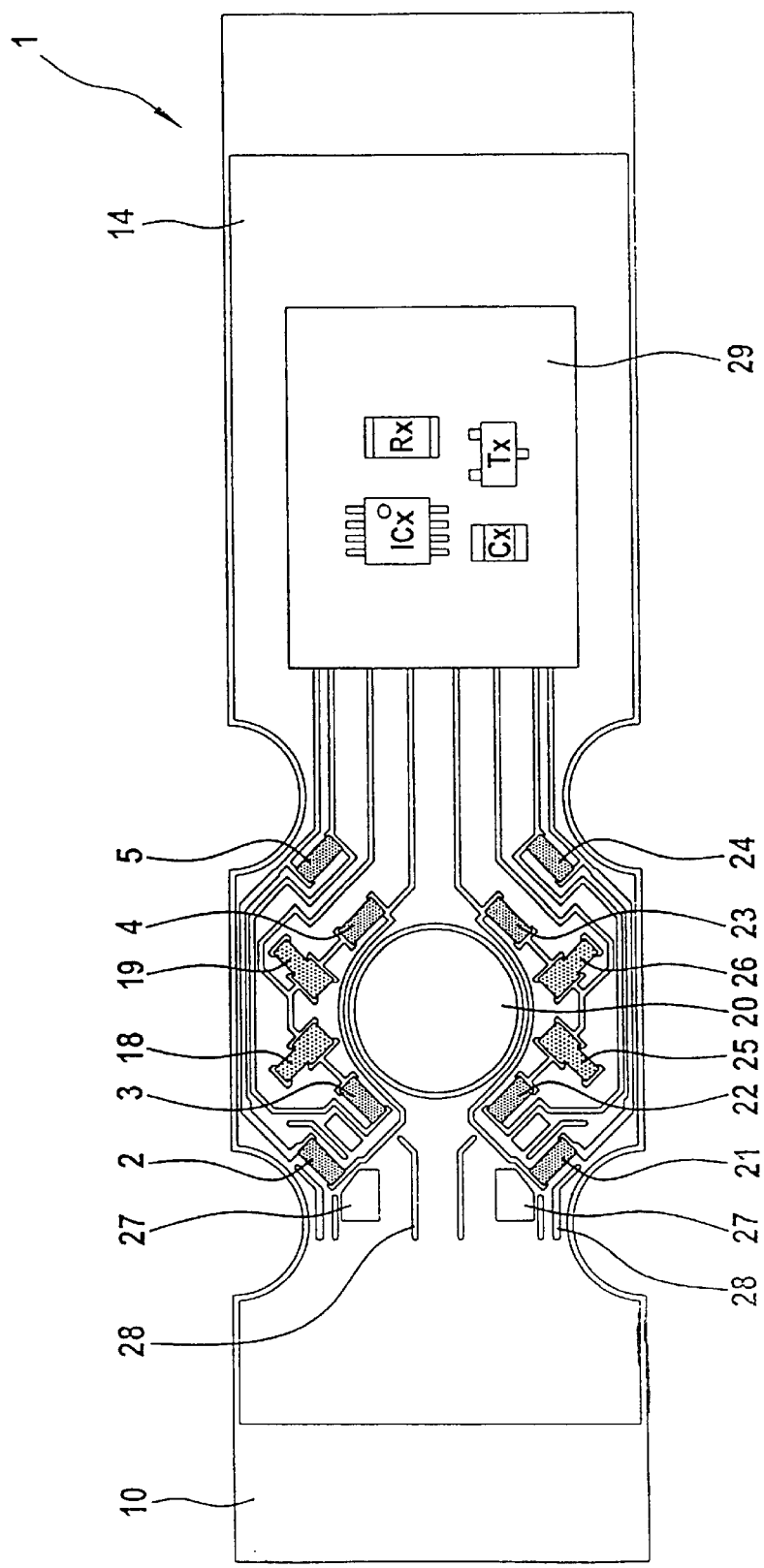
FIG. 6 shows a torque sensor with balancing resistors.

In order to ensure compensation of the bending moments in the case of these balancing resistors 18, 19 too, the balancing resistors must, like the thick-film resistors 2 to 5, be placed and connected up at an identical distance from and at an angle of equal magnitude to the neutral zone (z axis) of the shaft 1. This can be seen clearly from FIG. 6, where the balancing resistors 18, 19 are arranged between the thick-film resistors 2, 3 and 4, 5, around the aperture designed as a hole 20.

In order to give the torque sensor a redundant configuration for applications that are critical for safety, a second measuring bridge of identical construction can be arranged underneath the hole 20 in addition to the measuring bridge comprising the resistors 2 to 5 and arranged above the opening 20, this second measuring bridge having the resistors 21 to 24 and meeting the same conditions as regards the neutral axis for bending as the resistance-measuring bridge described.

We claim:

1. A torque transducer comprising a bridge circuit formed by electrically connecting strain-sensitive thick-film resistors by means of conductor tracks, the thick-film resistors being arranged directly on a metallic component to be subjected mechanically to torsional loading and extending outside a direction of extension of an axis of the metallic component which is neutral with respect to bending moments, an electrical signal corresponding to a strain of the thick-film resistors when the component is subjected to torsion being tapable, wherein at least one thick-film resistor (2; 4) in one arm of the bridge circuit is at a same distance from and at an angle of a same magnitude to the neutral axis (z axis) of the component (1) to be loaded as an opposite thick-film resistor (3; 5) in a second arm of the bridge circuit, the orientation and the location of said at least one thick-film resistor serving to avoid an influence of forces of bending and compression and tension upon a sensing of torque.

2. A torque transducer comprising a bridge circuit formed by electrically connecting strain-sensitive thick-film resistors by means of conductor tracks, the thick-film resistors being arranged directly on a metallic component to be subjected mechanically to torsional loading and extending outside a direction of extension of an axis of the metallic component which is neutral with respect to bending moments, an electrical signal corresponding to a strain of the thick-film resistors when the component is subjected to torsion being tapable, wherein the thick-film resistors (2, 4; 5, 3) arranged in one bridge arm are at a same distance from and at an angle of a same magnitude to the neutral axis (z axis), of the component in order to avoid an influence of forces of bending and compression and tension upon a sensing of torque.

3. A mechanical/electrical transducer comprising a bridge circuit formed by electrically connecting strain-sensitive thick-film resistors by means of conductor tracks, the thick-film resistors being arranged directly on a metallic component to be subjected mechanically to torsional loading and extending outside a direction of extension of an axis of the metallic component which is neutral with respect to bending moments, an electrical signal corresponding to a strain of the thick-film resistors when the component is subjected to torsion being tapable, wherein at least one thick-film resistor (2; 4) in one arm of the bridge circuit is at a same distance from and at an angle of a same magnitude to a neutral axis (z axis) of the component (1) to be loaded as an opposite thick-film resistor (3; 5) in a second arm of the bridge circuit, wherein the component (1) to be loaded has on a surface an aperture (11) which, when the component (1) is mechanically stressed in at least one area (12, 13) of the surface of the component in which the thick-film resistors (2, 3, 4, 5) are positioned, a relationship of unequal magnitude between a longitudinal and a transverse strain is produced.

4. A mechanical/electrical transducer as claimed in claim 3, wherein a first bridge circuit (2, 4; 3, 5) is arranged above the aperture (20) and a second bridge circuit (21, 26; 22, 24) is arranged below the aperture (20).

5. A mechanical/electrical transducer as claimed in claim 3, wherein the aperture (11) is formed as a through opening in the component (1).

6. A mechanical/electrical transducer as claimed in claim 5, wherein the opening (11) is formed as a slotted hole, a first thick-film resistor (3) of a bridge arm (3, 5) being arranged in a vicinity of a first radial zone (12) of the slotted hole (11), and the second thick-film resistor (5) of the bridge arm (3, 5) being arranged in a vicinity of a second radial zone (13) of the slotted hole (11), the signal being tapped from a bridge (2, 4; 3, 5) between the thick-film resistors (3, 5) arranged in different radial zones (12, 13).

7. A mechanical/electrical transducer as claimed in claim 6, wherein the thick-film resistors (2, 3, 4, 5) of both bridge arms (2, 4; 3, 5) are arranged in the radial zones (12, 13) above or below the slotted hole (11).

8. A mechanical/electrical transducer as claimed in claim 7, wherein the thick-film resistors (2, 3, 4, 5) are arranged on a flat surface of the component (1), which is produced from steel or steel alloys.

9. A torque transducer as claimed in claim 2, wherein a thick-film balancing resistor (18, 19), a resistance value of which is lower than that of the thick-film resistors (2, 3, 4, 5), is arranged in each bridge arm (2, 5; 3, 4).

10. A torque transducer as claimed in claim 9, wherein thick-film balancing resistors (18, 19) of two bridge arms (2, 4; 3, 5) are at the same distance from the neutral axis (z axis) of the component (1).

11. A torque transducer as claimed in claim 9, wherein for gradation of the resistance, the thick-film balancing resistor (18, 19) comprises resistance tracks connected in parallel which are severed sequentially during the balancing process.

12. A torque transducer as claimed in claim 9, wherein for production by screen printing, the bridge circuit (2, 4; 3, 5) has a symmetrical layout.

13. A torque transducer as claimed in claim 12, wherein the-symmetrical layout is achieved by the arrangement of stub lines (28) or reactors (27).

14. A torque transducer comprising a bridge circuit formed by electrically connecting strain-sensitive thick-film resistors by means of conductor tracks, the thick-film resistors being arranged directly on a metallic component to be subjected mechanically to torsional loading and extending outside a direction of extension of an axis of the metallic component which is neutral with respect to bending moments, an electrical signal corresponding to a strain of the thick-film resistors when the component is subjected to torsion being tapable, wherein at least one thick-film resistor (2; 4) in one arm of the bridge circuit is at a same distance from and at an angle of a same magnitude to a neutral axis (z axis) of the component (1) to be loaded as an opposite thick-film resistor (3; 5) in a second arm of the bridge circuit, wherein a thick-film balancing resistor (18, 19), a resistance value of which is lower than that of the thick-film resistors (2, 3, 4, 5), is arranged in each bridge arm (2, 5; 3, 4).

15. A mechanical/electrical transducer as claimed in claim 14, wherein thick-film balancing resistors (18, 19) of two bridge arms (2, 4; 3, 5) are at the same distance from the neutral axis (z axis) of the component (1).

16. A mechanical/electrical transducer as claimed in claim 14, wherein, for gradation of the resistance, the thick-film balancing resistor (18, 19) comprises resistance tracks connected in parallel which are severed sequentially during the balancing process.

17. A mechanical/electrical transducer as claimed in claim 14, wherein, for production by screen printing, the bridge circuit (2, 4; 3, 5) has a symmetrical layout.

18. A mechanical/electrical transducer as claimed in claim 17, wherein the symmetrical layout is achieved by the arrangement of stub lines (28) and/or reactors (27).

19. A torque transducer comprising a bridge circuit formed by electrically connecting strain-sensitive thick-film resistors by means of conductor tracks, the thick-film resistors being arranged directly on a metallic component to be subjected mechanically to torsional loading and extending outside a direction of extension of an axis of the metallic component which is neutral with respect to bending moments, an electrical signal corresponding to a strain of the thick-film resistors when the component is subjected to torsion being tapable, wherein the thick-film resistors (2, 4; 5, 3) arranged in one bridge arm are at a same distance from and at an angle of a same magnitude to a neutral axis (z axis), wherein the component (1) to be loaded has on a surface an aperture (11) which, when the component (1) is mechanically stressed in at least one area (12, 13) of the surface of the component in which the thick-film resistors (2, 3, 4, 5) are positioned, a relationship of unequal magnitude between a longitudinal and a transverse strain is produced.

20. A mechanical/electrical transducer as claimed in claim 19, wherein the aperture (11) is formed as a through opening in the component (1).

21. A mechanical/electrical transducer as claimed in claim 20, wherein the opening (11) is formed as a slotted hole, a first thick-film resistor (3) of a bridge arm (3, 5) being arranged in a vicinity of a first radial zone (12) of the slotted hole (11), and the second thick-film resistor (5) of the bridge arm (3, 5) being arranged in a vicinity of a second radial zone (13) of the slotted hole (11), the signal being tapped from a bridge (2, 4; 3, 5) between the thick-film resistors (3, 5) arranged in different radial zones (12, 13).

22. A mechanical/electrical transducer as claimed in claim 21, wherein the thick-film resistors (2, 3, 4, 5) of both bridge arms (2, 4; 3, 5) are arranged in the radial zones (12, 13) above or below the slotted hole (11).

23. A mechanical/electrical transducer as claimed in claim 22, wherein the thick-film resistors (2, 3, 4, 5) are arranged on a flat surface of the component (1), which is produced from steel or steel alloys.

24. A mechanical/electrical transducer as claimed in claim 19, wherein a first bridge circuit (2, 4; 3, 5) is arranged above the aperture (20) and a second bridge circuit (21, 26; 22, 24) is arranged below the aperture (20).

\* \* \* \* \*